United States Patent [19]

De Jong et al.

[11] 4,215,000
[45] Jul. 29, 1980

[54] DISSOLVING BARIUM SULFATE SCALE WITH AQUEOUS SOLUTIONS OF BICYCLIC MACROCYCLIC POLYETHERS AND ORGANIC ACID SALTS

[75] Inventors: Feike De Jong; David N. Reinhoudt; Gerridina J. Torny-Schutte, all of Amsterdam, Netherlands

[73] Assignee: Shell Development Company, Houston, Tex.

[21] Appl. No.: 951,701

[22] Filed: Oct. 16, 1978

[30] Foreign Application Priority Data

Apr. 20, 1978 [GB] United Kingdom ............... 15674/78

[51] Int. Cl.$^2$ ............................................... C09K 3/00
[52] U.S. Cl. ............................... 252/8.55 B; 166/312;
166/279; 252/80; 252/82; 210/58; 134/22 R
[58] Field of Search ................... 252/8.55 B, 80, 82;
166/279, 244 C, 311, 312, 305 R, 310; 134/22
R, 22 C, 2; 210/58, 59

[56] References Cited

U.S. PATENT DOCUMENTS

| | | | |
|---|---|---|---|
| 3,523,582 | 8/1970 | Fulford | 166/310 X |
| 3,531,468 | 9/1970 | Park et al. | 252/182 |
| 3,660,287 | 5/1972 | Quiattnni | 166/311 X |
| 3,684,720 | 8/1972 | Richardson | 252/8.55 B |
| 3,793,209 | 2/1974 | Thompson | 252/8.55 B |
| 4,030,548 | 6/1977 | Richardson et al. | 252/182 |

OTHER PUBLICATIONS

"Tetrahedron Letters" No. 34 (1969), pp. 2889–2892.

Primary Examiner—Benjamin R. Padgett
Assistant Examiner—J. Lloyd Barr

[57] ABSTRACT

Barium sulfate scale is dissolved by contacting it with an aqueous solution of: a bicyclic macrocyclic polyether in which the intramolecular cavity or cript is preferentially receptive to the cations of alkaline earth metals, at least a catalytically effective proportion of an alkali metal salt of an organic acid, and enough dissolved alkaline inorganic alkali metal or ammonium compound to provide a solution pH of at least about 8.

14 Claims, 1 Drawing Figure

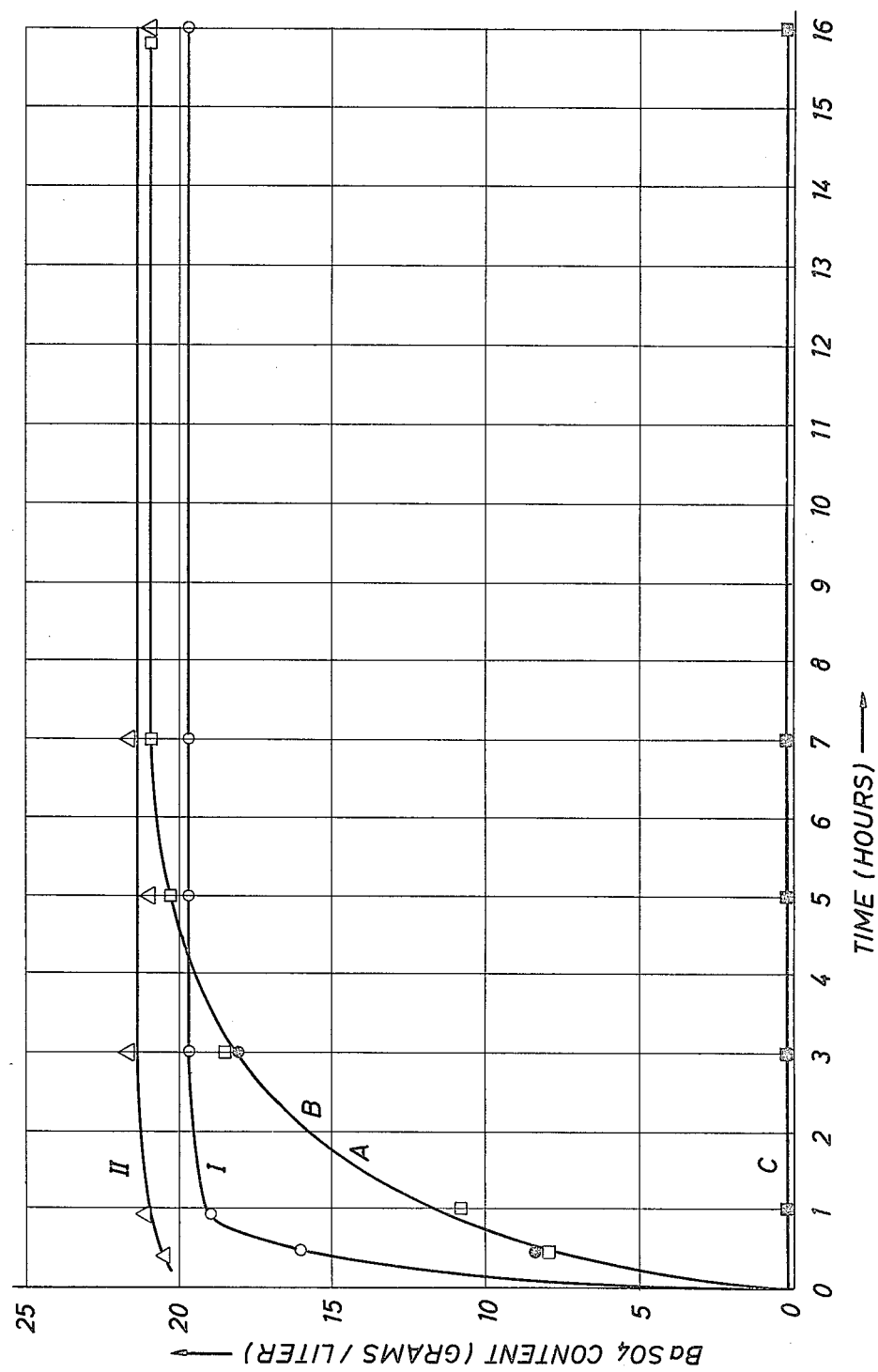

DISSOLVING BARIUM SULFATE SCALE WITH AQUEOUS SOLUTIONS OF BICYCLIC MACROCYCLIC POLYETHERS AND ORGANIC ACID SALTS

BACKGROUND OF THE INVENTION

The invention relates to dissolving barium sulfate solids from locations in and around the boreholes of wells and/or other relatively remote locations into which a fluid can be flowed.

Various well treating procedures for removing various types of scales with aminopolyacetic acid salt chelating agents, such as EDTA (ethylenediaminetetraacetic acid), are known. For example, U.S. Pat. No. 2,396,938 (filed in 1944) described removing boiler scale with aqueous solutions of such a chelant and an alkali meta hydroxide. U.S. Pat. No. 2,802,788 (filed in 1952) describes a radiator cleaning composition in which such a chelant salt is included in a aqueous solution along with an inorganic chelant, e.g., sodium tripolyphosphate. U.S. Pat. No. 3,308,065 (filed in 1963) describes a substantially one-pore volume treatment for removing calcium sulfate-containing scale with an ammoniated or aminated chelant, e.g., an ammonium salt of EDTA. U.S. Pat. No. 3,660,287 (filed in 1967) describes a similar treatment for dissolving calcium sulfate-containing scale with a mixture of an EDTA salt and water soluble inorganic carbonate salt. Such prior processes were consistent in utilizing an amount of solution which about filled one pore volume of the region within which the scale was to be removed and using a concentration of chelant such that that volume of the solution contained a stoichiometric excess relative to the amount of scale to be dissolved. U.S. Pat. Nos. 2,877,848 and 4,030,548 relate to using relatively dilute solutions. The U.S. Pat. No. 4,030,548 describes the tendancy for relatively concentrated EDTA solutions to become quickly saturated with a Ba-EDTA complex and suggests a once-through-dynamic wash treatment with enough solution to gradually remove the solid.

Bicyclic macrocyclic polyethers and the barium sulfate dissolving capability of aqueous solutions containing them are disclosed in "Tetrahedron Letters" No. 34 (1969), pages 2889–2892. U.S. Pat. No. 3,966,766 contains an example of such a polyether and the naming and position numbering conventions relative to such compounds. That examples comprises 4, 7, 13, 16, 21, 24-hexaoxa-1,10-diazabicyclo[8.8.8]hexacosane (which is hereafter referred to as "Compound A"), of the formula:

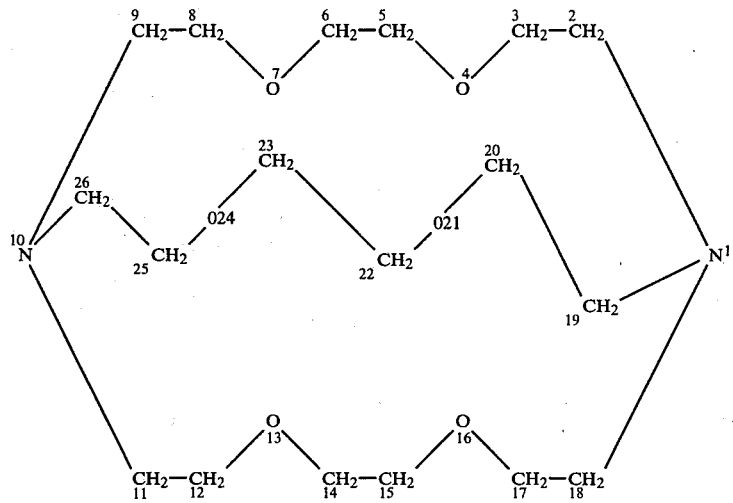

SUMMARY OF THE INVENTION

The present invention relates to a process for dissolving a barium sulfate solid from a remote location into which fluid can be flowed, by flowing an aqueous solution into the remote location and into contact with the barium sulfate. The solution consists essentially of: water, a bicyclic macrocyclic polyether, a proportion of alkali metal salt of an organic acid which is less than that of the polyether but is sufficient to catalytically increase the rate of barium solid dissolving by the polyether, and enough dissolved alkaline inorganic alkali metal or ammonium compound to provide a solution pH of at least about 8. The polyether is a bicyclic macrocyclic polyether of the general formula I:

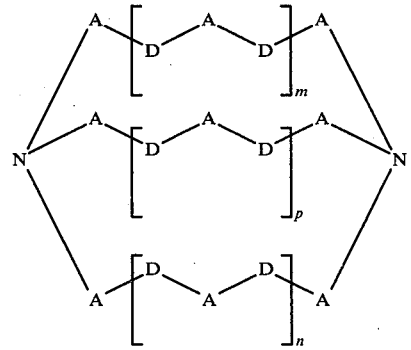

wherein each A represents a hydrocarbon radical having up to 12 carbon atoms and each D represents an oxygen or a sulphur atom or a hydrocarbon radical having up to 12 carbon atoms or $=N-R^2$ group (in which group $R^2$ is a hydrogen atom or a hydrocarbon radical having up to 12 carbon atoms, a hydrocarbonsulfonyl radical having up to 12 carbon atoms, an alkoxycarbonyl-methylene radical having fewer than 5 carbon atoms or a carboyxmethylene radical), at least two of the said D members being an oxygen or a sulphur atom or $=N-R^2$ group, and m, n and p are integers from 0 to 5. The polyether contains an intramolecular cavity or crypt that is much more receptive to the cations of the alkaline earth metals than to the cations of the alakli metals.

DESCRIPTION OF THE DRAWING

The drawing illustrates a plot of the amount of barium sulfate dissolved with time while being contacted with various aqueous liquids.

DESCRIPTION OF THE INVENTION

The present invention is at least in part premised on the discovery that, in an alkaline aqueous solution, a bicyclic macrocyclic polyether and a salt of an organic acid cooperate so that the rate at which barium sulfate is dissolved is greatly increased without altering the high capacity for dissolving barium sulfate that characterizes a salt-free alkaline aqueous solution of the polyether. This combination of polyether and organic acid salt provides a barium sulfate-dissolving solution which (a) is capable of containing a relatively high concentration of the sulfate-dissolving ingredients, (b) dissolves the sulfate by forming barium ion complexes having a relatively high solubility in the aqueous solution, and thus, (c) is capable of providing a barium sulfate-dissolving procedure that needs only a relatively short down-time and amount of fluid injection with respect to a well or other equipment being treated.

The symbol A in formula I preferably represents a hydrocarbon radical having in the range from 2 to 8 carbon atoms, such as ethylene, diethylene, triethylene and tetraethylene radicals. It preferably represents an ethylene radical. The A may also represent a 1,2-phenylene radical. The integers m, n and p are preferably in the range of from 1 to 3. The hydrocarbon radical $R^2$ may represent is preferably an alkyl group with 1 to 8, and particularly 1 to 4 carbon atoms. The hydrocarbonsulfonyl radial $R^2$ may represent has preferably 1 to 8 and more preferably 1 to 4 carbon atoms. The alkoxycarbonyl radical $R^2$ may represent is preferably a methoxycarbonyl or an ethoxycarbonyl radical. A particularly preferred example is the 4,7,13,15,21,24-hexaoxa-1,10-diaza-bicyclo[8.8.8]hexacosane ("compound A"). Other suitable compounds of formula I are those in which A represents an ethylene group and D, m, p and n are:

| D | m | p | n | |
|---|---|---|---|---|
| oxygen | 2 | 1 | 1 | , or |
| oxygen | 2 | 1 | 2 | , or |
| oxygen | 2 | 2 | 2 | |

Further examples of compounds of formula I are:
16-methyl-4,7,13,21,24-pentaoxa-1,10,16-triaza-bicyclo[8.8.8.]cosane and
13,16-dimethyl-4,7,21,24-tetraoxa-1,10,13,16-tetraazabicyclo[8.8.8.]hexacosane.

In the present scale dissolving solutions or compositions the concentration of the bicycle macrocyclic polyether should be sufficient to cause a significant proportion of barium sulfate solid to be dissolved within each increment of the solution with which it is contacted. This concentration is preferably substantially equivalent to the saturation concentration of the complex of barium with the polyether in the aqueous composition at the temperature of the region in which the dissolution is to be effected. Suitably, the concentration of the bicyclic macrocyclic polyether is at least 0.01 mol/1 mole per liter and is preferably higher than 0.05 mol/l, for example, 0.3 mol/l.

The molar ratio of the salt of an organic acid to the bicyclic macrocyclic polyether is not critical and may vary within wide limits. The applicants have found that the commercially attractive features of the invention become apparent when this molar ratio is very low, for example between 0.0001 and 0.001; in other words, when the salt of the organic acid is present in a so-called "catalytic amount". This molar, ratio is preferably in the range of from 0.001 to 1, particularly from 0.01 to 0.5. If desired, this molar ratio may be higher than 1 but the proportion of the salt is preferably less than that of the polyether.

The aqueous compositions used in the present invention may contain well-treating or cleaning solution additives which are compatible with the compositions. Such additives include, for example, surfactant materials. These surfactant materials may be ionic or nonionic. Examples are alkali metal salts of alkylarylsulfonates such as sodium dodecylbenzenesulfonate, alkali metal salts of sulphates of fatty alcohols such as sodium lauryl sulphate and such materials having a polyoxyethylene chain. The surfactant material may be present in the composition in a concentration in the range of from, for example, 1 to 3 percent by weight.

The contact time for dissolving the barium sulphate solid with the present aqueous composition will vary not only with the conditions but also with the relative proportions of the constituents in the composition and will generally be in the range of from 1 minute to three hours; for example, from 15 minutes to 1.5 hours. In general, when using the present aqueous composition for dissolving a barium sulphate solid, there is no need to employ temperatures substantially above ambient temperature. Temperatures as low as 10° to 20° C. have been found satisfactory. However, the relatively high temperature (say 30°–70° C. or higher) prevailing in an oil producing formation into which a production well penetrates, greatly enhances the rate of dissolution of the solid.

The pH of the present aqueous composition must be at least 8, because protonation of the free bicyclic macrocyclic polyether (which occurs when the solution becomes acidic) reduces its tendency to form barium complexes. In general, the higher the pH increases above 8 the higher the concentration of the unprotonated portion of the macrocyclic polyether will be and, consequently, the higher the extent to which the macrocyclic polyether can be loaded up with barium ions. In view of this, the present aqueous composition preferably has a pH of at least 10.0, and particularly a pH in the range of from 10.0 to 11.5. The unprotonated portion of the macrocyclic polyether can be increased by incorporating into the aqueous composition, a pH-increasing alkaline inorganic alkali metal or ammonium compound whose cation is hardly compatible, if at all, with the bicyclic macrocyclic polyether. Such bores include the alkali metal or ammonium hydroxides or salts of weak acids.

The cation of the salt of the organic acid present in the aqueous composition may be any cation, for example, a lithium, sodium, potassium or ammonium ion which is relatively incompatible with the bicyclic macrocyclic polyether of formula I. The organic acid is preferably a polycarboxylic acid and particularly an aminopolycarboxylic acid, which may be a mono-, but is preferably a polyaminopolycarboxylic acid. Among the polyaminopolycarboxylic acids the alkylenepolyaminopolycarboxylic acids are preferred. Particularly preferred are alkylenepolyaminopolycarboxylic acids of the general formula II:

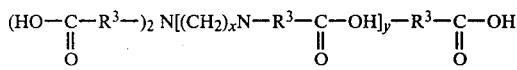

wherein each of the subscripts x and y is an integer of from 1 to 4 and $R^3$ represents an alkylene group with one to three carbon atoms and wherein up to x of the carboxyalkyl groups can be replaced by betahydroxyethyl groups. Examples of suitable alkylenepolyaminopolycarboxylic acids are:

ethylenediaminetetraacetic acid ($R^3$ is —CH$_2$—; x=2; y=1),
ethylenetriaminepentaacetic acid ($R^3$ is —CH$_2$—; x=2; y=2),
propylene-1,3-diaminetetraacetic acid ($R^3$ is —CH$_2$—; x=3; y=2), and the isomeric butylenediaminetetraacetic acids.
Ethylenediaminetetraacetic acid (hereinafter also named "EDTA") is particularly preferred.

Other examples of aminopolycarboxylic acids are:
N-hydroxyethyliminodiacetic acid,
monoethanolethylenediaminetriacetic acid,
diethanolethylenediaminediacetic acid,
2,2',2''-nitrilotriacetic acid,
tri(carboxymethyl)amine, and
propylene-1,2-diaminetetraacetic acid.

In another preferred embodiment of the present process the polyaminopolycarboxylic acid is 1,10-di(carboxymethyl)-1,10-diaza-4,7,13,16-tetraoxacyclooctadecane. This compound is hereinafter referred to as compound "B". Further examples of organic acids which may be used are:

pyridinecarboxylic acids, for example, 2-pyridinecarboxylic acid, 3-pyridinecarboxylic acid, 4-pyridinecarboxylic acid, 2,3-pyridinedicarboxylic acid, 2,4-pyridinedicarboxylic acid, 2,5-pyridinedicarboxylic acid and 2,6-pyridinedicarboxylic acid; alkanoic acids, for example, formic acid, acetic acid, propionic acid and butyric acid; alkanedioic acids, for example, oxalic acid, malonic acid, succinic acid and glutaric acid; alkanepolycarboxylic acids, for example, 2,3,5-hexanetricarboxylic acid, 1,2,3-butanetricarboxylic acid and 2-(3-carboxypropyl)-1,1,5,6-heptanetetracarboxylic acid; hydroxy acids, for example, citric acid, glycolic acid, lactic acid, glyceric acid and tartronic acid; phenols, for example, phenol, o-cresol, m-cresol, p-cresol, 2,3-xylenol, pyrocatechol and pyrogallol;

benzenecarboxylic acids, for example, benzenecarboxylic acid, 1,2-benzenedicarboxylic acid, 1,3-benzenedicarboxylic acid, 1,4-benzenedicarboxylic acid and salicylic acid;

benzenediphosphonic acid; sulphonic acids, for example, benzenephosphonic acid, 1,2-benzenediphosphonic acid, 1,3-benzenediphosphonic acid and 1,4-benzenediphosphonic acid;

sulphonic acids, for example, methanesulphonic acid, methanedisulphonic acid, 1,2-ethanedisulphonic acid and propanesulphonic acid;

carboxyamino compounds, for example, 1,2-di(dicarboxyamino)benzene and 1,2-di(dicarboxyamino)cyclohexane.

Compound B, 1,10-di(carboxymethyl)-1,10-diaza-4,7,13,16-tetraoxacyclooctadecane may be prepared by reacting 1,10-diaza-4,7,13,16-tetraoxacyclooctadecane with a salt of 2-chloroacetic acid in the presence of a base. Compound B has the formula:

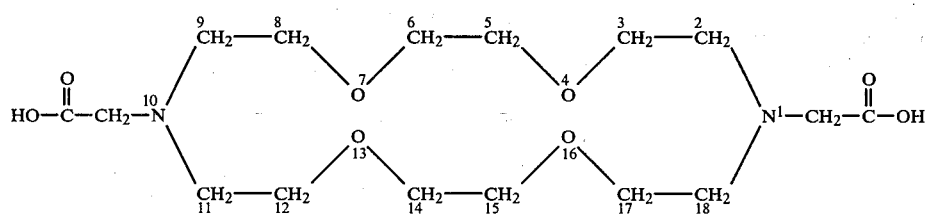

Very good results have been obtained in such preparations with alkali metal salts of 2-chloroacetic acid. Suitable bases are alkali metal hydroxides, for example, sodium hydroxide and potassium hydroxide.

The barium sulphate scale-dissolving capacities of several aqueous compositions have been demonstrated in the laboratory tests described in the following examples.

The experiments described below were carried out in a cylindrical glass vessel having a height of 2.5 cm and an internal diameter of 0.8 cm. The vessel was charged with the starting materials and then fixed lengthwise to a horizontal shaft parallel to its central axis. The shaft was rotating at a speed of 180 revolutions per minute. The temperature of the vessel was 20° C.

EXAMPLES I AND II AND COMPARATIVE EXPERIMENTS A, B AND C

The vessel was charged with 0.3 mmol (millimole) barium sulphate, an aqueous liquid (1 ml) and five stainless-steel balls having a diameter of 0.32 cm. Five experiments were carried out, each with a different aqueous liquid. Table I states the compositions of the aqueous liquids.

Table I

| | Starting concentration, mol/l | | |
|---|---|---|---|
| | Compound A | EDTA | KOH |
| Comparative Experiment A | 0.1 | 0 | 0 |
| Comparative Experiment B | 0.1 | 0 | 0.1 |
| Comparative Experiment C | 0 | 0.005 | 0.05 |
| Example I | 0.1 | 0.005 | 0 |
| Example II | 0.1 | 0.005 | pH = 11$^x$ |

$^x$so much KOH was added that the pH reached a value of 11.

At various intervals the rotating shaft was brought to a standstill, the suspension was allowed to separate by settling, a sample was drawn from the aqueous layer and the amount of barium sulphate dissolved therein was determined. Table II presents these amounts for the five experiments.

Table II

| Time | BaSO4 dissolved in the aqueous liquid, g/l | | | | |
|---|---|---|---|---|---|
| | Comparative Experiment | | | Example | |
| h | A | B | C | I | II |
| 0.5 | 8.7 | 8.5 | 0.9 | 16.0 | 20.4 |
| 1 | 10.9 | 11 | 0.9 | 18.9 | 21.1 |
| 3 | 18.2 | 18.5 | 0.9 | 19.7 | 21.8 |
| 5 | 20.4 | 20.5 | 0.9 | 19.7 | 21.1 |
| 7 | 21.1 | 21 | 0.9 | 19.7 | 21.8 |
| 16 | 21.1 | 21 | 0.9 | 19.7 | 21.1 |

From the amounts of 0.9 and 21.1 g BaSO4/l, dissolved in Comparative Experiment C and Example II, respectively, it can be calculated that the lodings of EDTA in Comparative Experiment C and of Compound A in Example II are 77% and 90% respectively.

In FIG. 1 the content of barium sulphate, in g/l, of the aqueous liquid and the time, in hours, at which these contents were measured have been set out along the vertical and horizontal axes, respectively. The values for the time and contents of barium sulphate presented in Table II have been plotted and are indicated with five different marks, each of which relates to one experiment, as indicated in the figure with A, B, C, I and II. A curve has been drawn through each set of marks thus obtained for one particular aqueous liquid. The curves for Comparative Experiments A and B coincide. The position of curves I and II shows that barium sulphate has dissolved very rapidly in the compositions according to the invention.

EXAMPLES III–XVII

The vessel was charged with barium sulphate (0.15 mmol), Compound A (0.1 mmol), an organic acid (0.005 mm01) and water (1 ml) to which so much lithium hydroxide had been added that the pH reached a value of 11. After one hour's rotation the amount of barium sulphate dissolved in the aqueous liquid was determined.

$$Q = \frac{[BaSO_4]_{t=1} \text{ is the}}{[BaSO_4]_{t\simeq} - [BaSO_4]_{t=1}}$$

was calculated. In this quotient $[BaSO_4]_{t=1}$ is the content of dissolved barium sulphate in the aqueous liquid and $[BaSO_4]_{t\simeq}$ is the stoichiometric content of dissolved barium sulphate, being 23.3 g/l.

Fifteen organic acids were tested in this manner. Table III states the organic acids tested and presents the values found for Q.

Table III

| Example | Organic acid Name | Formula | Q |
|---|---|---|---|
| III | Ethylenediaminetetraacetic acetic acid | (HOOC—CH2)2N—CH2—CH2—N(CH2—COOH)2 | 9.6 |
| IV | 2,6-pyridinedicarboxylic acid | HOOC—(pyridine)—COOH | 2.7 2.7 |
| V | tri(carboxymethyl)amine | N(CH2COOH)3 | 1.5 |
| VI | 1,2-di(dicarboxyamino)cyclohexane | cyclohexane-N(COOH)2, N(COOH)2 | 1.3 |
| VII | 1,2-benzenedicarboxylic acid | benzene-COOH, COOH | 1.3 |
| VIII | citric acid | HOOCC(OH)(CH2COOH)2 | 1.3 |
| IX | di(carboxymethyl)amine | HN(CH2COOH)2 | 1.2 |
| X | malonic acid | HOOC CH2COOH | 1.2 |
| XI | succinic acid | HOOC CH2CH2COOH | 1.2 |
| XII | salicylic acid | benzene-COOH, OH | 1.2 |
| XIII | benzenephosphonic acid | benzene-PO3H2 | 1.2 |
| XIV | methanesulphonic acid | CH3SO3H | 1.0 |
| XV | methanedisulphonic acid | CH2(SO3H)2 | 0.8 |
| XVI | 1,2-ethanedisulphonic acid | HO3SCH2CH2SO3H | 0.8 |
| XVIII | 1,10-di-(carboxymethyl)-1,10-diaza-4,7,13,16-tetraoxacyclooctadecane | Compound B | 7.9 |

EXAMPLE XVIII

The experiment of Example III was repeated with 0.00125 instead of 0.005 mmol of EDTA. The value found for Q was 2.4 after one hour's rotation.

COMPARATIVE EXPERIMENT D

The vessel was charged with water (1 ml), barium sulphate (0.15 mmol), Compound A (0.1 mmol) and 1,4,7,10,13,16-hexaoxacyclooctadecane. After one hour's rotation the value for Q was 0.5.

COMPARATIVE EQUIPMENT E

The vessel was charged with water (1 ml), barium sulphate (0.15 mmol) and Compound A (0.1 mmol). After one hour's rotation the value for Q was 0.5.

EXAMPLE XIX

The vessel was charged with water (1 ml), natural barite (430 mg, grain size 4 mm) and EDTA (0.018 mmol). Then, so much potassium hydroxide was added that the pH of the aqueous liquid reached a value of 11 and Compound A (0.37 mmol) was added. The natural barite contained the following compounds:

| Compound | % w | Compound | % w |
|---|---|---|---|
| $BaSO_4$ | 80 | $Fe_2O_3$ | 3 |
| $SiO_2$ | 13 | $SrSO_4$ | 2 |

Hence, 1.5 mmol of barium sulphate was present in the flask. After 90 hours' rotation the aqueous liquid contained dissolved barium sulphate in a concentration of 0.116 M. Hence, Compound A had been used with an efficiency of $0.116/0.37 \times 100 = 31\%$.

COMPARATIVE EXPERIMENT F

The experiment described in Example XIX was repeated in the absence of EDTA. Compound A was used with an efficiency of 14%.

EXAMPLE XX—PREPARATION OF COMPOUND B

A solution of sodium hydroxide (80 mmol) in water (12 ml) and 1,10-diaza-4,7,13,16-tetraoxacyclooctadecane (20 mmol) were consecutively added to a solution of 2-chloroacetic acid (40 mmol) in water (8 ml). The mixture formed was stirred for 4 hours at 60° C., cooled to 25° C. and acidified with a concentrated solution of hydrochloric acid (specific gravity 9.19) until a pH of 1 was reached. The water was evaporated from the acidified mixture at a pressure of 2 kPa, leaving a residue to which methanol (40 ml) was added. The suspended sodium chloride was filtered off, the methanol was evaporated from the filtrate and the residue formed was taken up in a mixture of emthanol (6 ml) and chloroform (18 ml) at reflux temperature. The solution formed was cooled to 20° C. and the precipitated 2HCl salt of compound B (4.9 g, yield 55%) was filtered off. This salt had a melting point of 106°–107° C. Its PMR spectrum showed the following absorptions (60 MHz, $D_2O$)

|  | δ, ppm |
|---|---|
| 4 H singlet | 0.58 |
| 8 H triplet, broad | 0.88 |
| 16 H multiplet | 1.10 |

The 2HCl salt of compound B (201.7 mg) was dissolved in water (7 ml), 1 drop of phenolphthalein was added and the solution was titrated with a 0.09 N aqueous solution of sodium hydroxide (10.95 ml) until the colour changed; in this way a solution of compound B was obtained.

In the cleaning method according to the invention, the aqueous cleaning composition adapted for dissolving barium sulphate is contacted with the surfaces to be cleaned for a period of time sufficiently long to remove at least a portion of the barium sulphate scale on said surfaces. Hereby, the composition may be circulated over the surfaces to be cleaned. Thus, when cleaning equipment in a well, the composition may be circulated through the tubular goods in the well, such as by being pumped down through the production tube and being returned to the surface through the annular space between the production tubs and the casing (or vice versa). Also, the composition may be pumped down through the production tubing and into the formation, thereby cleaning the well and the formation pore space by dissolving barium sulphate present therein whilst flowing along the surfaces that need cleaning. The spent composition of such once-through-dynamic wash procedure is later on returned to the surface by the fluids that are produced through the well after the cleaning operation. In an alternative manner, the cleaning composition may be applied batchwise. The composition is then pumped down in the well and optionally into the pore space of the formation parts to be cleaned and kept in contact in non-flowing condition with the surfaces that are covered with barium sulfate scale, over a period of time sufficiently long to dissolve at least a considerable part of said scale. If desired, portions of the cleaning composition in which barium sulfate have been dissolved can be acidified to protonate the bicyclic macrocyclic polyether so that it can be recovered and reused.

What we claim is:

1. A process for dissolving barium sulphate solid from a remote location into which fluid can be flowed which process comprises:

flowing into said remote location and into contact with the barium sulphate an aqueous liquid consisting essentially of water, a bicyclic macrocyclic polyether, an alkali metal salt of a polycarboxylic organic acid in a proportion which is not more than that of said polyether but is sufficient to catalytically increase the rate at which barium sulphate is dissolved and enough dissolved alkaline inorganic alkali metal or ammonium material to provide a solution pH of at least about 8;

using as the bicyclic macrocyclic polyether a compound of the formula:

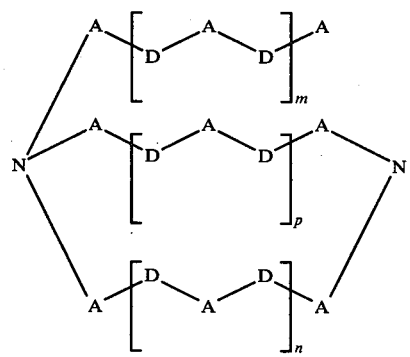

wherein (a) A represents a hydrocarbon radical having up to 12 carbon atoms and D represents a member of the group consisting of oxygen atoms, sulfur atoms, hydrocarbon radicals having up to 12 carbon atoms and $=N-R^2$ groups in which $R^2$ represents a hydrogen atom, hydrocarbon radical having up to 12 carbon atoms, a hydrocarbonsulfonyl radical having up to 12 carbon atoms, an alkoxycarbonyl radical having fewer than 5 carbon atoms, an alkoxycarbonyl-methylene radical having fewer than 5 carbon atoms or a carboxymethylene radical, (b) at least two of the D's represents a member of the group consisting of sulphur atom or =N—R$^2$ group, (c) m, n and p are integers from 0 to 5 inclusive, and (d) the bicyclic macrocyclic polyether contains an intramolecular cavity which is preferentially receptive to the cations of the alkaline earth metals.

2. Process of claim 1, in which A represents a hydrocarbon radical of from 2 to 8 carbon atoms and m, n and p are integers from 1 to 3.

3. Process of claim 1 in which the bicyclic macrocyclic polyether is 4,7,13,16,21,24-hexaoxa-1,10-diazabicyclo-[8.8.8]hexacosane.

4. Process of claim 1, in which the solution has a pH of from about 10.0 to 11.5.

5. Process of claim 1, in which the organic acid salt is a salt of an aminopolycarboxylic acid.

6. Process of claim 1, in which the organic acid salt is a salt of ethylenediaminetetraacetic acid.

7. Process of claim 1, in which the organic acid salt is a salt of 1,10-di(carboxymethyl)-1,10-diaza-4,7,13,16-tetraoxacyclooctadecane.

8. Process of claim 1, in which the salt of the organic acid and the bicyclic macrocyclic polyether are present in a molar ratio of from about 0.001 to 1.

9. A composition for dissolving barium sulphate solid consisting essentially of a bicyclic macrocyclic polyether and an alkali metal salt of a polycarboxylic organic acid of a kind and amount capable of being dissolved in an aqueous liquid to form the aqueous liquid solution specified in claim 1.

10. The aqueous composition of claim 9, in which the polyether is 4,7,13,16,21,24-hexaoxa-1,10-diazabicyclo-[8.8.8]hexacosane and the salt is an alkali metal salt of ethylenediaminetetraacetic acid.

11. The process of claim 9, in which A represents a hydrocarbon radical of from 2 to 8 carbon atoms and m, n and p are integers of from 1 to 3.

12. The process of claim 9, in which the solution has a pH of from about 10.0 to 11.5.

13. The process of claim 9, in which the polycarboxylic organic acid salt is a salt of 1,10-di(carboxymethyl)-1,10-diaza-4,7,13,16-tetraoxacyclooctadecane.

14. The process of claim 9, in which the salt of the polycarboxylic organic acid and the bicyclic macrocyclic polyether are present in a molar ratio of from about 0.001 to 1.

* * * * *